United States Patent
Dagasan et al.

(10) Patent No.: US 12,270,700 B2
(45) Date of Patent: Apr. 8, 2025

(54) SIGNAL LOSS DETECTION METHOD FOR DISTRIBUTED ACOUSTIC SENSING SYSTEMS

(71) Applicant: ASELSAN ELEKTRONIK SANAYI VE TICARET ANONIM SIRKETI, Ankara (TR)

(72) Inventors: Abdulsamet Dagasan, Ankara (TR); Mustafa Akur, Ankara (TR); Muhammet Emre Sahinoglu, Ankara (TR)

(73) Assignee: ASELSAN ELEKTRONIK SANAYI VE TICARET ANONIM SIRKETI, Ankara (TR)

( * ) Notice: Subject to any disclaimer, the term of this patent is extended or adjusted under 35 U.S.C. 154(b) by 287 days.

(21) Appl. No.: 18/077,275

(22) Filed: Dec. 8, 2022

(65) Prior Publication Data

US 2023/0213376 A1    Jul. 6, 2023

(30) Foreign Application Priority Data

Dec. 30, 2021   (TR) .............................. 2021/021919

(51) Int. Cl.
*G01H 9/00*        (2006.01)
*G01D 5/353*        (2006.01)

(52) U.S. Cl.
CPC ............ *G01H 9/004* (2013.01); *G01D 5/353* (2013.01)

(58) Field of Classification Search
CPC ............ G01H 9/00; G01H 9/004; G01D 5/26; G01D 5/34; G01D 5/353
See application file for complete search history.

(56) References Cited

U.S. PATENT DOCUMENTS

| | | | | |
|---|---|---|---|---|
| 7,877,023 B2 * | 1/2011 | Uto | ...................... | H04B 10/695 398/208 |
| 11,193,817 B2 * | 12/2021 | Cedilnik | ................ | G01H 9/004 |

FOREIGN PATENT DOCUMENTS

JP        2004163294 A       6/2004

* cited by examiner

*Primary Examiner* — Nguyen Q. Ha
(74) *Attorney, Agent, or Firm* — Bayramoglu Law Offices LLC

(57) ABSTRACT

A method that detects locations of undesired levels of signal loss in DAS systems that use optical fibers. In the method, raw DAS signals are received from an optical fiber of a DAS system with dual photodetector positioned at the end(s) of the optical fiber. Locations on the optical fiber are named "channels" having a certain length on the optical fiber and are numbered according to distances of the channels from the photodetector. The raw DAS signals received from each channel are processed by the dual photodetector to obtain raw DAS statistical data for each channel. The obtained raw DAS statistical data are then reconstructed to produce reconstructed DAS statistical data in which noise has been removed. The reconstructed DAS statistical data form power statistics for each channel. The power statistics is expected to be linearly decreasing with a farther distance of each channel from the photodetector. A change detection algorithm is provided to detect possible undesired levels of signal loss and to find the locations of the signal loss based on the power statistics.

1 Claim, 2 Drawing Sheets

SIGNAL LOSS DETECTION METHOD FOR DISTRIBUTED ACOUSTIC SENSING SYSTEMS

CROSS REFERENCE TO THE RELATED APPLICATIONS

This application is based upon and claims priority to Turkish Patent Application No. 2021/021919, filed on Dec. 30, 2021, the entire contents of which are incorporated herein by reference.

TECHNICAL FIELD

The present invention relates to a method that detects the location of undesired levels of signal loss for distributed acoustic sensing (DAS) systems

BACKGROUND

Rayleigh-Scattering based DAS systems use fiber optic cables to provide distributed strain sensing over large distances. The optical fiber cable becomes an acoustic sensor that provides spatio temporal data over a specific line of area. These systems allow monitoring of activities over distances up to 50 km with a laser source. The locations on fiber cable are named as channels to keep track of the environment. A channel represents a certain amount of length on the fiber cable and numbered is according to the distance of current fiber cable part compared to the DAS system.

In the DAS system, received light from the far distances is very weak, requiring a high power amplifier to be used. On the other hand, with high gain the light received from close-in distances are amplified too much to the point of saturating the system. To overcome this problem, the light power is divided into two parts with optical coupler, 90% of the light is used for far distances and 10% of the light is used for close-in distances.

Fiber cable signal has losses from absorption and back reflection of the light caused by impurities in the glass. The signal power decreases linearly with distance depending on the mode and the wavelength of the fiber. The spatio temporal data obtained by the DAS system is used to get the statistics of the acoustic signal at each channel. In order to get rid of possible anomalies in the signal, the data is taken for a period of time. Those statistics represents the signal-to-noise ratio (SNR) of each channel. The SNR of data on fiber cable can be modelled as attenuating linearly with distance to the source. A Gaussian distribution model, with linearly decreasing mean with respect to distance, is fitted to the calculated statistics.

The application numbered JP2004163294A describes a structure displacement/abnormality detector to detect and measure the presence of a relative displacement in a revetment structure, generation of abnormality therein and a generation position thereof, by laying preliminarily a general and commercially available optical fiber sensor for communication along the line-like revetment structure. This detector is constituted using an optical fiber cable, and is provided with the optical fiber cable, a displacement/abnormality sensor and a displacement/abnormality management device. The displacement/abnormality sensor has a locking part, a base plate, the optical fiber cable and a detection signal. The displacement/abnormality management device has an OTDR (Optical Time-Domain Reflectometer) measuring instrument. OTDR is used to assess the integrity of the fiber link infrastructure. It is an effective method to identify the power loss within the fiber cable, yet in order to test the fiber optic cable, it requires the DAS system to shut down for a period of time. The OTDR meters are also expensive.

SUMMARY

The purpose of this invention is to detect the location of undesired levels of signal loss in DAS systems that use optical fibers. In proposed method, raw DAS signals are received from an optical fiber of a DAS system with dual photodetector positioned at the end(s) of the optical fiber. Locations on the optical fiber are named "channels" having a certain length on the optical fiber and are numbers according to distances of the channels from the photodetector. The raw DAS signals received from each channel are processed by the dual photodetector to obtain raw DAS statistical data for each channel. The obtained DAS statistical data are then reconstructed to produce reconstructed DAS statistical data in which noise has been removed. The reconstructed DAS statistical data form power statistics for each channel. The power statistics is expected to be linearly decreasing with a farther distance from the photodetector. A change detection algorithm is provided to detect possible undesired levels of signal loss and to find the location of the signal loss based on the power statistics.

DETAILED DESCRIPTION OF THE EMBODIMENTS

Data Processing

Figure 1:
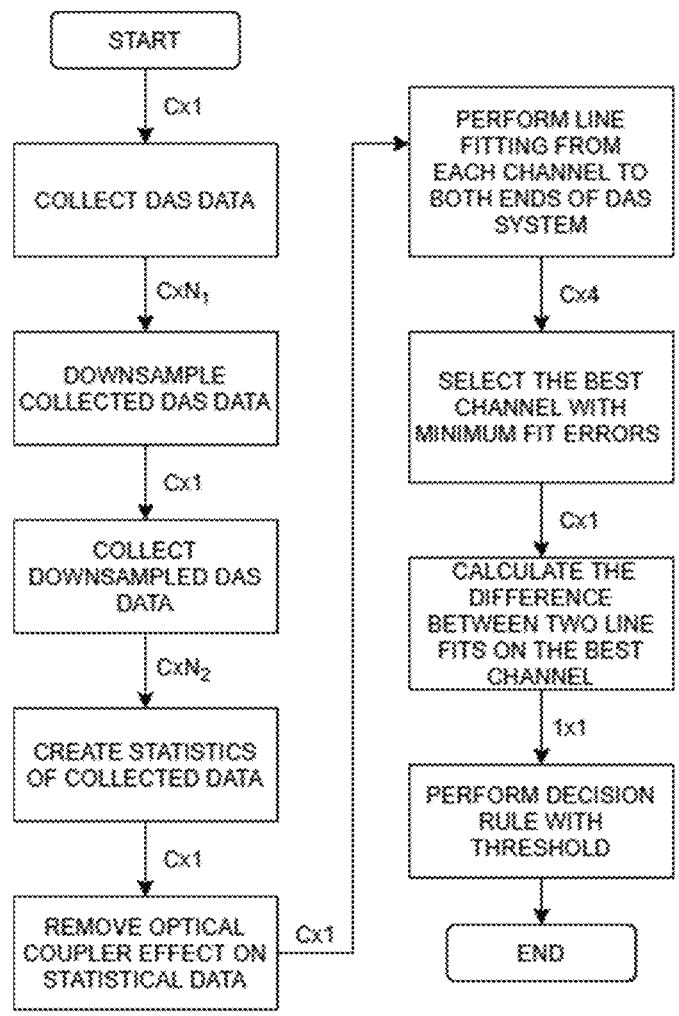
FIG. 1 shows block diagram of the present invention.

Data pre-processing step comprises of the first five blocks in the FIG. 1. In the collect DAS data block, the DAS data of C channels from one time frame is collected. In the down sample collected DAS data block, $N_1$ of the data obtained is down sampled. In the collect down sampled DAS data block, $N_2$ of the down sampled data is collected, meaning a total of $(N_1 \times N_2)$ data is collected and used up to this point. In the create statistics of collected data block, the standard deviation of each channel is calculated to get a statistical power data from $N_2$ data obtained. In the remove optical coupler effect on statistical data block, the effect of the coupler is negated by amplifying the merged signals at close-in distances. This is possible because of the Gaussian assumption. If a gaussian random variable is multiplied with a constant, the new random variable is also a Gaussian random variable with its standard deviation multiplied with the constant.

Signal Loss Detection

Signal loss detection step comprises of the remaining blocks. In the perform line fitting from each channel to both ends of DAS system block, the aim is to find if an abrupt change in the power levels with respect to channels occurs or not. The assumption here is, if a finite sample $y_1, \ldots, y_N$ assumed to have a probability density $p(\theta)$ and for each i, $1 \leq i \leq N$, the samples obtained reside in this probability distribution, there is no change in the distribution of the samples. However, for an index k, if there can be found $\theta_0$ and $\theta_1$, that $\theta=\theta_0$ for $1 \leq i \leq k$, $\theta=\theta_1$ for $k \leq i \leq N$, it can be said that there is a change in the distribution at position k. Let $y_k$ be a sequence of independent random observations with Gaussian distribution of $(u_k, \sigma)$ where $u_k=\alpha+\beta k$, $1 \leq k \leq N$. In this case $\theta=(\alpha,\beta)$, $\theta_0=(\alpha_0, \beta_0)$, $\theta_1=(\alpha_1, \beta_1)$. This distribution explains the power statistics obtained by the last block with k being the channel and $y_k$ being the power of the $k^{th}$ channel. Therefore, at each channel k, maximum likelihood estimation can be used to find $\theta_0$ and $\theta_1$, which ultimately equals to fitting two lines for its lower channels (from 0 to k) and higher channels (from k to N), respectively.

In the select the best channel with minimum fit errors block, a maximum likelihood estimation is used to find the best channel that minimizes the errors when the two lines are fit to explain the data. Since the distribution is gaussian, it is equal to calculating sum of squared errors at each channel compared to lines.

In the calculate the difference between two line fits on the best channel block, the two parameters $\theta_0$ and $\theta_1$ used at the best channel $c_{best}$ and the difference between the lower channels fit and higher channels fit are calculated.

In the perform decision rule with threshold block, the calculated difference is compared with a threshold, and if the threshold is exceeded, the system gives an alarm that there is a significant signal loss at the specified channel $c_{best}$.

Work Principle

Figure 2:
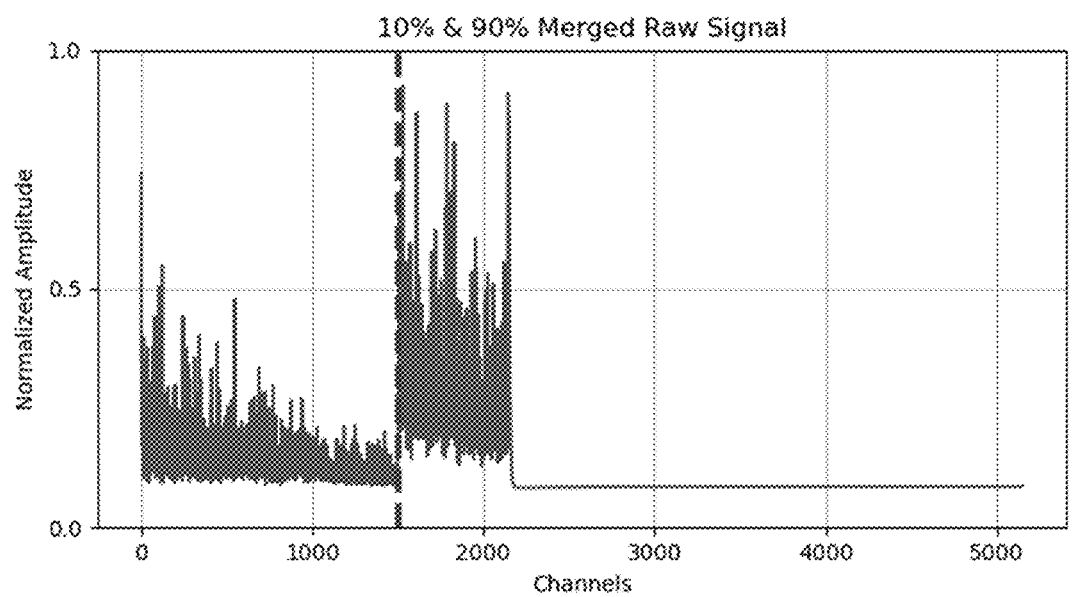
FIG. 2 shows received raw data from a DAS system with dual photodetector.

The received raw data from the DAS system with dual photodetector can be seen in FIG. 2. Using this raw data, the data that would be obtained by the sensor without the dual photodetector can be reconstructed, but this will not be necessary for the algorithm hence it will not be calculated. Instead, statistics are obtained from the received raw data, then processed according to the dual photodetector.

Although the amplitude of the raw data gives information about the power level of the channels, it is highly affected from the interior and exterior noises. To get rid of those effects, the fluctuations in the signal at a specific channel with respect to time can be used. Then the obtained statistical data are reconstructed into a signal that would be obtained if the raw signal didn't put through a photodetector. The reconstructed statistical data is used to form the power statistics of the DAS signal in each channel. The power statistics are expected to be linearly decreasing with the distance from the sensor. A change detection algorithm is developed to detect the possible undesired levels of signal loss and to find the location of the signal loss.

Figure 3:
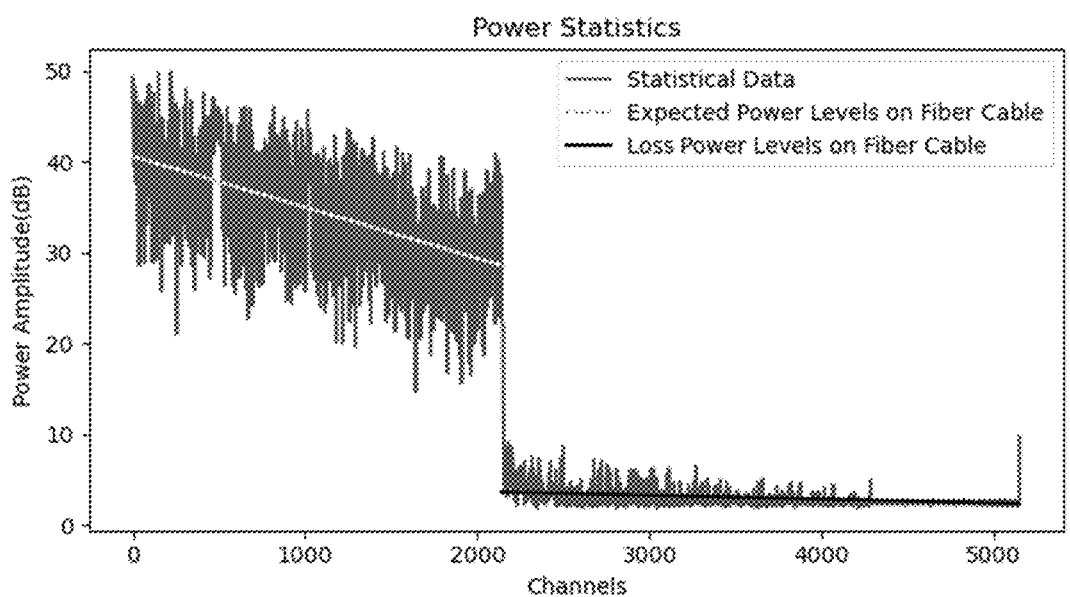
FIG. 3 shows the power statistics and the detection of power loss on channel 2150.

It can be seen that there is a significant power loss in channel 2150 in FIG. 3. The algorithm chooses the hypothesis that there is a significant power loss in the system. The lines correspond to the optimum Gaussian distribution means with $(\alpha_0+i\beta_0)$, $(\alpha_1+i\beta_1)$, where i is the channel number.

The invention claimed is:

1. A signal loss detection method for distributed acoustic sensing (DAS) systems, comprising steps of:
    collecting DAS data of channels from one time frame,
    down sampling the DAS data and collecting down sampled DAS data,
    calculating a standard deviation of each channel to get statistical power data from the down sampled DAS data,
    removing an optical coupler effect on the statistical power data,
    performing line fitting from each channel to two ends of the DAS system to find if an abrupt change in power levels with respect to the channels occurs or not,
    selecting a best channel with minimum fit errors using a maximum likelihood estimation,
    calculating a difference between two-line fits on the best channel,
    comparing the difference with a threshold,
    giving an alarm that there is a significant signal loss at the best channel if the threshold is exceeded.

* * * * *